(No Model.) 2 Sheets—Sheet 2.
E. M. WILCOX.
CORN HARVESTER.
No. 456,229. Patented July 21, 1891.
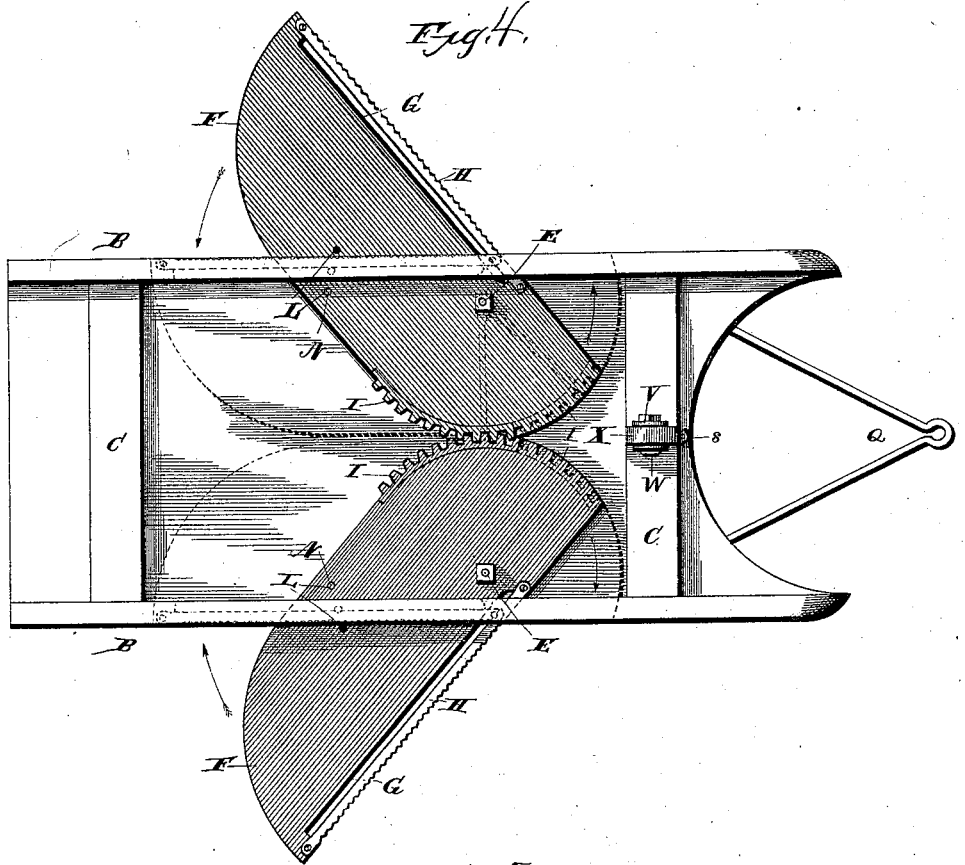
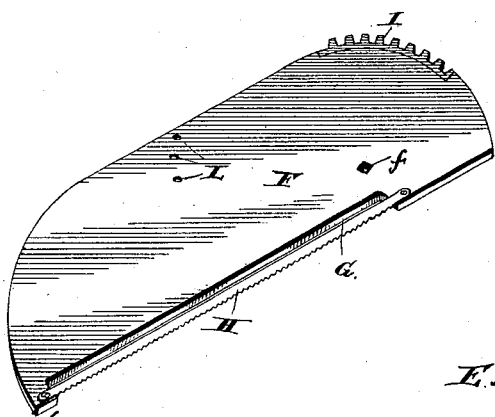
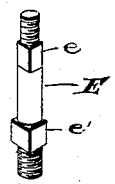
Witnesses
Geo. M. Thorpe.
H. E. Price.
Inventor
E. M. Wilcox.
By his Attorneys
Higdon & Higdon.

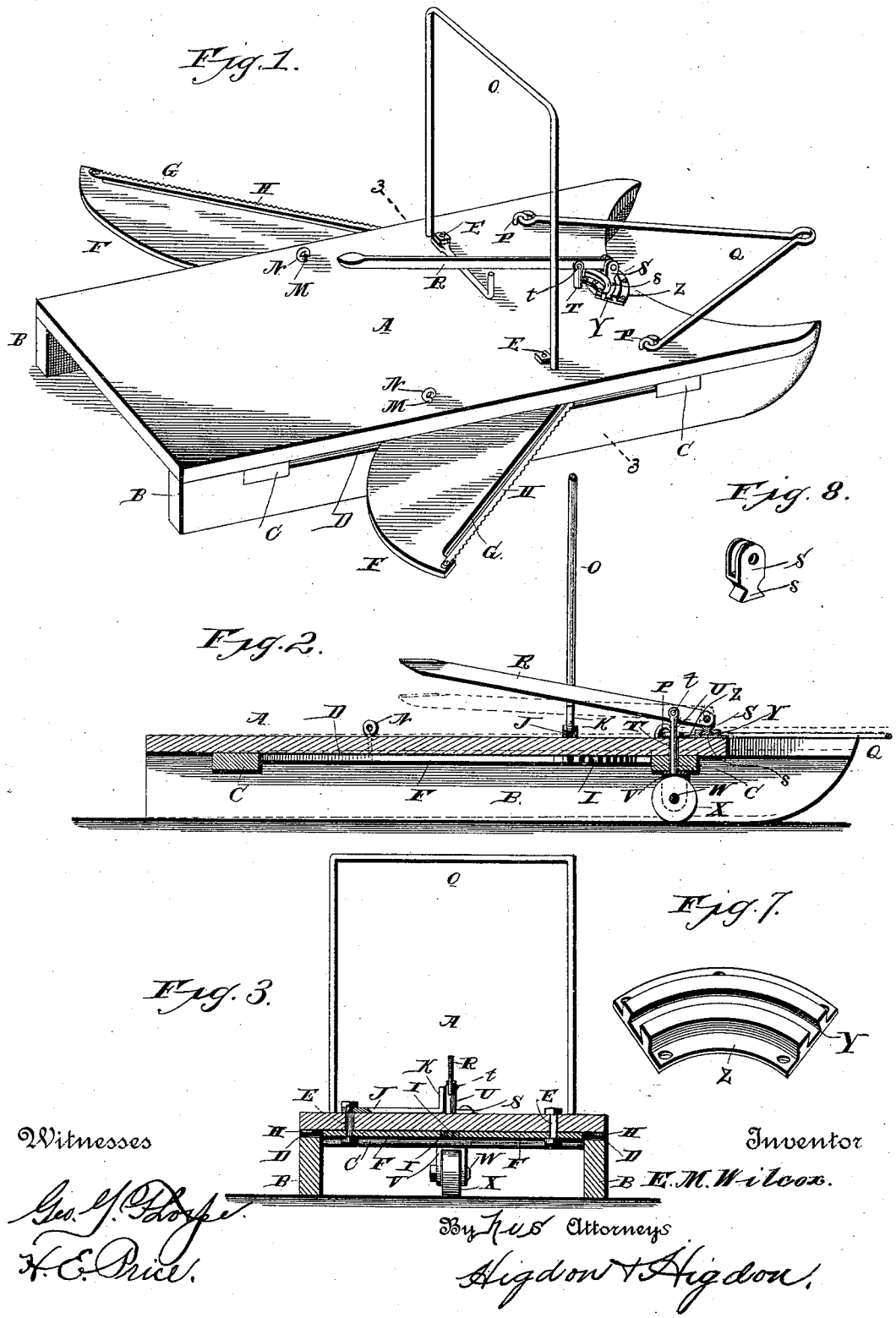

UNITED STATES PATENT OFFICE.

EDWARD MONTAGUE WILCOX, OF KANSAS CITY, MISSOURI.

CORN-HARVESTER.

SPECIFICATION forming part of Letters Patent No. 456,229, dated July 21, 1891.

Application filed January 13, 1891. Serial No. 377,611. (No model.)

*To all whom it may concern:*

Be it known that I, EDWARD MONTAGUE WILCOX, of Kansas City, Jackson county, Missouri, have invented certain new and useful Improvements in Corn-Harvesters, of which the following is a full, clear, and exact description, reference being had to the accompanying drawings, forming a part hereof.

My invention relates to machines for harvesting cornstalks from the field and the objects of my invention are to provide a simple, strong, and durable form of harvester which shall be easy to operate and very effective in operation, and which shall also be comparatively inexpensive in construction.

To the above purposes my invention consists in certain peculiar and novel features of construction and arrangement, as hereinafter described and claimed.

In order that my invention may be fully understood, I will proceed to describe it with reference to the accompanying drawings, in which—

Figure 1 is a perspective view of a cornstalk-harvester embodying my invention. Fig. 2 is a central longitudinal section of the same. Fig. 3 is a transverse vertical section of the same on the line 3 3 of Fig. 1. Fig. 4 is an underside plan view of the harvester. Fig. 5 is a detached perspective view of one of the pivotal cutter-carriers. Fig. 6 is a detached perspective view of the operating-bolt for the cutter-carriers. Fig. 7 is a detached perspective view of the guide-block for the steering-lever.

In the said drawings, A designates the top or platform of the harvester, the said platform being of general oblong rectangular form, excepting that it is preferably segmentally recessed at its front end and of sufficient size to accommodate two or more persons upon its upper side. Beneath the two longer sides of this platform are secured two runners B, each of which is formed with an upwardly and forwardly curved front end, as shown. These runners are braced laterally by two cross-pieces C, which extend beneath the front and rear portions of the platform, and the ends of which are firmly attached to the upper parts of the runners in any suitable or preferred manner. In the upper part of each of these runners is formed an elongated recess D, through which the two cutter-carriers F work, as hereinafter explained. Each of these cutter-carriers F is of elongated form, having one straight side extending entirely throughout the length of the carrier, and having the ends of its opposite or inner side connected to the ends of the carrier in the form of segmental curves. The inner forward curved portions of each of these carriers E is formed or provided with a segmental rack I, for a purpose to be presently explained, and the outer side of each carrier is formed with an elongated recess G. Each of the carriers F is provided with a cutter H, which is of elongated form, and the ends of which are bolted or otherwise suitably secured to the projecting end portions of the carrier, the said cutters thus lying across the recesses G of the carriers, and having thus unimpeded contact with the cornstalks. The outer cutting-edge of each of these cutters is preferably toothed or serrated after the fashion of a saw, so that as the harvester is drawn forward the teeth or serrations of the cutters shall insure the severance of the cornstalks. Each of these cutter-carriers is secured in position beneath the platform A of the harvester by a bolt, which passes through the carrier near its front end and also near its outer side, the said bolts also passing through the body of the platform. One of the bolts E is shown in Fig. 6, the lower end of said bolt being screw-threaded to receive a nut, which prevents the bolt from being lifted or thrown upwardly out of position, and having, also, just above its threaded lower end an enlarged angular portion $e'$, upon the upper side of which rests the corresponding carrier E. The stem or body portion of this bolt passes through an angular opening $f$, in the described portion of the carrier E, and also through the platform of the harvester, and the upper part $e$ of said bolt is made square or angular to receive an operating arm or lever J. This lever J is formed with an angular opening or eye at one end to receive the angular portion $e$ of the bolt, and the said lever is retained in connection with the bolt by a nut, which is screwed upon the upper end of the bolt. The opposite end K of the lever J is turned upward at right angles, so as to afford a convenient handle for the lever.

The companion cutter-carrier is similarly secured beneath the platform A, excepting that its opening, which corresponds in location with the opening f, is round instead of angular, so that the companion carrier can turn upon its bolt E'. It will be seen that when the two carriers E are in the described position in the harvester they extend through the recesses D of the runners B, and that their rack-segments I mesh with each other, so that when the handle J is turned in one or the opposite direction the carriers will be extended outward laterally from the sides of the harvester or retracted inwardly, so that their outer edges shall lie snugly along the sides of the harvester.

T designates a standard, which extends upwardly through the front cross-piece C, and which carries at its lower end a bearing V, through which passes the axle-pin W of a caster-wheel X, the said caster-wheel thus being located beneath the front part of the harvester midway between the two runners B. The upper end of the standard T is bifurcated to receive the front part of a steering-lever R, a pin t passing transversely through the two arms of the standard and also through the lever and pivotally connecting the latter to the standard. Upon the upper side of the platform A, at the front end of the same and midway of its width, is placed a plate Z, which is preferably segmental in form, and on the upper side of which are formed two parallel segmental guides Y, the adjacent sides of which are undercut or beveled, so as to form a dovetailed space between them. The outer extremity of the steering-lever R is pivoted between the arms of the bifurcated upper end of a guide-block S, the lower part s of which is beveled outwardly and downwardly to fit into the space between the two segmental guides Y, and so as to move in the space between said guides. The rear end of the steering-lever R is preferably flattened, as shown, to form a treadle-surface upon which the operator can place his foot. It will thus be seen that when the machine is to be turned at the end of the row the operator presses with his foot upon the rear end of the lever R, thus raising the front end of the harvester off of the ground and bringing the weight of the harvester upon the caster-wheel X and the rear ends of the runners B. As the harvester is being turned, the operator throws the rear end of the steering-lever either one way or the other, and thus prevents the caster-wheel from being dragged sidewise. Two staples or rings P are secured to the front end of the platform A and receive the rear ends of the V-shaped bar Q, to the acute angle outer portion or bend of which the team is properly hitched or harnessed. From the upper side of the platform A and about midway of the length of the same rises a vertical inverted-U-shaped frame O, the purpose of which is to afford a support for the operator as the harvester is being drawn along over the uneven surface of the field. In order to retain the cutter-carriers in any desired position of adjustment, said carriers are provided about midway of their length, near their inner sides, with a number of holes L, arranged in segmental order, and which are designed to receive two pins M, which extend downward through the sides of the platform, the upper ends of said pins having eyes N for convenience in manipulating the pins.

From the above description it will be seen that I have provided a simple, strong, and durable form of harvester which is inexpensive in construction and which can be easily and rapidly operated to properly cut the cornstalks in the field.

Having thus fully described my invention, what I claim as new therein, and desire to secure by Letters Patent, is—

1. An improved cornstalk-harvester comprising a vehicle-body and a pair of cutter-carriers pivotally connected to the body and having each a rack-segment at its front inner end, said segments intermeshing, so that a movement of one carrier shall produce a corresponding movement of the companion carrier, substantially as set forth.

2. An improved cornstalk-harvester comprising a suitable vehicle-body and a pair of cutter-carriers pivotally connected to said body and having intermeshing rack-segments at their inner front ends, and bolts extending through the top of the vehicle-body and pivotally connecting said carriers to the body, one of said bolts passing rigidly through one of the carriers and being provided at its upper end with a handle by which it is rotated to adjust the carriers, substantially as set forth.

3. An improved cornstalk-harvester comprising a sled-like body, a caster-wheel located beneath the front part of said body and having a standard extending loosely upward through said body and removable longitudinally through said body, a steering-lever pivoted at its front part to the upper end of the standard, a guide-plate mounted upon the upper side of the body at the front end of the same and having a dovetailed guide on its upper surface, and a guide-block pivotally connected at its upper end to the front end of the steering-lever and having an enlarged lower end to enter the said guide, substantially as set forth.

4. An improved corn-harvester comprising a suitable vehicle-body, a pair of cutter-carriers pivotally mounted thereon, each of said carriers having an elongated recess at its outer side or edge, and an elongated cutter secured to the outer edge of each carrier and extending across and in front of each recess, substantially as set forth.

5. An improved cornstalk-harvester comprising a sled-like body, a pair of cutter-carriers pivotally connected to the body and extending adjustably through the runners thereof, a caster-wheel located beneath the front end of the body and having a standard extending upwardly through said body, a steering-lever pivoted to the upper end of said standard, a segmental guide-plate upon the front of the body and to which the front end of the steering-lever is movably connected, and a vertical inverted-U-shaped bar supported upon the said body, substantially as set forth.

6. A corn-harvester provided with pivotal lateral swinging arms or cutter-carriers having their inner ends provided with radial cogs, with a lever attached to the top of the platform to the upper end of a pivotal pin, said pin being rigidly secured through a square opening $f$ in said swinging arms, whereby the arms by a single movement of the lever J back or forth can be adjusted to any desired angle or closed back under said platform, substantially as set forth.

7. An improved cornstalk-harvester comprising a sled-like body, a caster-wheel located beneath the front part of the body and having a standard extending loosely upward through said body and movable longitudinally through the same, and a steering-lever connected movably at its front end to the front part of the sled-body, and also connected pivotally at its front part to the upper end of the caster-wheel standard, substantially as set forth.

In testimony whereof I affix my signature in presence of two witnesses.

EDWARD MONTAGUE WILCOX.

Witnesses:
O. SWANSON,
A. L. BARBER.